March 10, 1964 W. L. CALABRESE 3,123,923
SCRAPER BLADE
Filed Oct. 11, 1961 2 Sheets-Sheet 1

INVENTOR.
William F. Calabrese
BY
Winnie & Barnard
ATTORNEYS

March 10, 1964
W. L. CALABRESE
3,123,923
SCRAPER BLADE
Filed Oct. 11, 1961
2 Sheets-Sheet 2
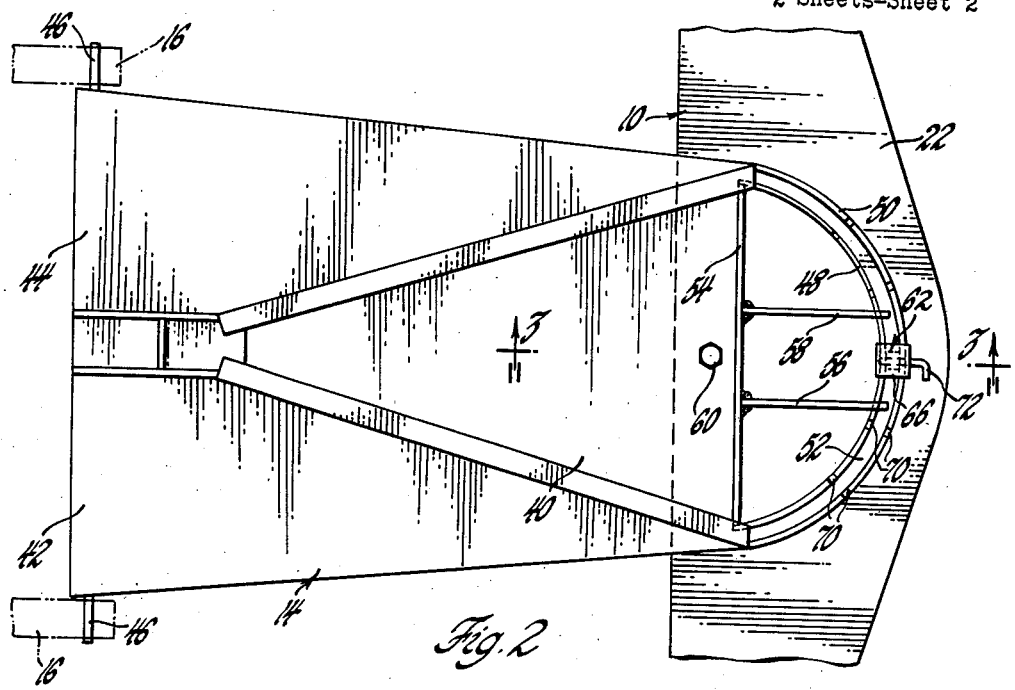
Fig. 2
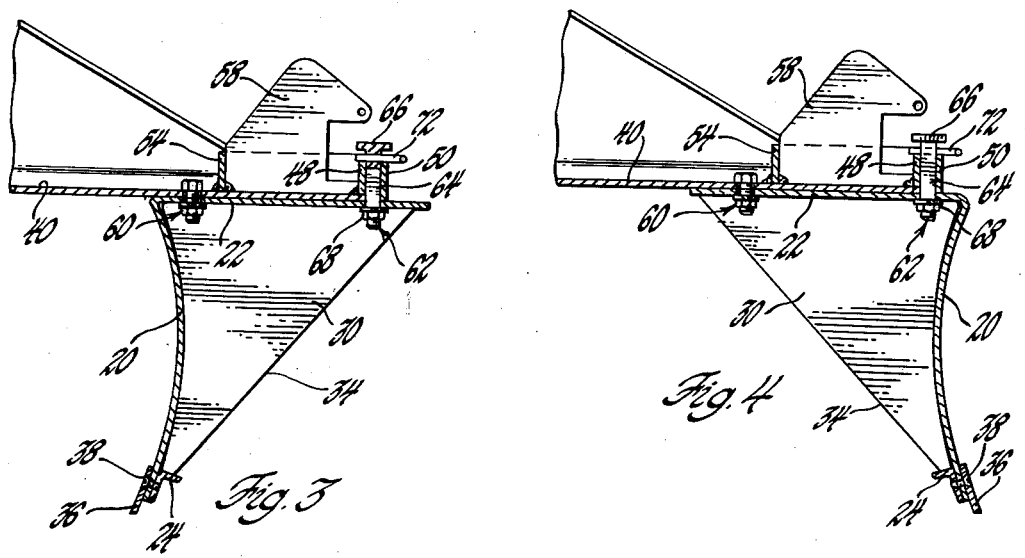
Fig. 3
Fig. 4
INVENTOR.
William F. Calabrese
BY
Winnie & Barnard
ATTORNEYS ns Patent Office 3,123,923
Patented Mar. 10, 1964

3,123,923
SCRAPER BLADE
William L. Calabrese, Utica, Mich., assignor to Bebco Experimental & Manufacturing Co., Washington, Mich., a corporation of Michigan
Filed Oct. 11, 1961, Ser. No. 144,392
2 Claims. (Cl. 37—180)

This invention relates to scraper blades for use by farm tractors and the like, and more particularly to a heavy duty utility blade of economical construction.

There are many uses for the commonly known scraper blade on small farms, suburban estates and elsewhere. Scraper blades are most useful for general farm work, landscaping, road maintenance, land leveling, grading, excavating, snow removal and other uses too numerous to mention.

Unfortunately, the scraper blades which are presently available are of a heavy and more complex construction than is actually required by anyone who only intends to make occasional use of the blade. The heavier gauge materials and more complicated construction of such presently available scraper blades makes the cost of such equipment more than the average purchaser cares to pay. Furthermore, the heavier construction of such blades makes them difficult to attach and disconnect from a small tractor, as well as to move about, for the user that does not need to have the scraper attachment in service for as long periods as others might require.

It is, accordingly, an object of this invention to provide a scraper blade of lightweight construction and yet of sufficiently durable construction to serve the numerous purposes required of it.

It is also an object of this invention to provide a scraper blade of simple and accordingly economical construction in order that the retail price will be reasonable and attractive to prospective purchasers.

Another object of this invention is to provide a scraper blade having a simple, inexpensive and easily operated means of adjustment to enable selected angular location of the blade member.

A further object of this invention is to provide a reversible scraper blade for either drag or back-fill use.

A still further object of this invention is to provide a scraper blade which may be weighted for extra duty service with whatever heavyweight material is readily available.

These and other objects and advantages in the practice of this invention will be more apparent after reading the following description of a preferred embodiment of this invention having reference to the accompanying drawings.

In the drawings:

FIGURE 2 is a top plan view of the scraper blade device of this invention;

FIGURE 3 is a cross sectional view of the scraper blade as seen in the plane of line 3—3 of FIGURE 2 and looking in the direction of the arrows thereon;

FIGURE 4 is a cross sectional view of the scraper blade, similar to FIGURE 3, with the blade member shown in a reversed position.

Figure 1:
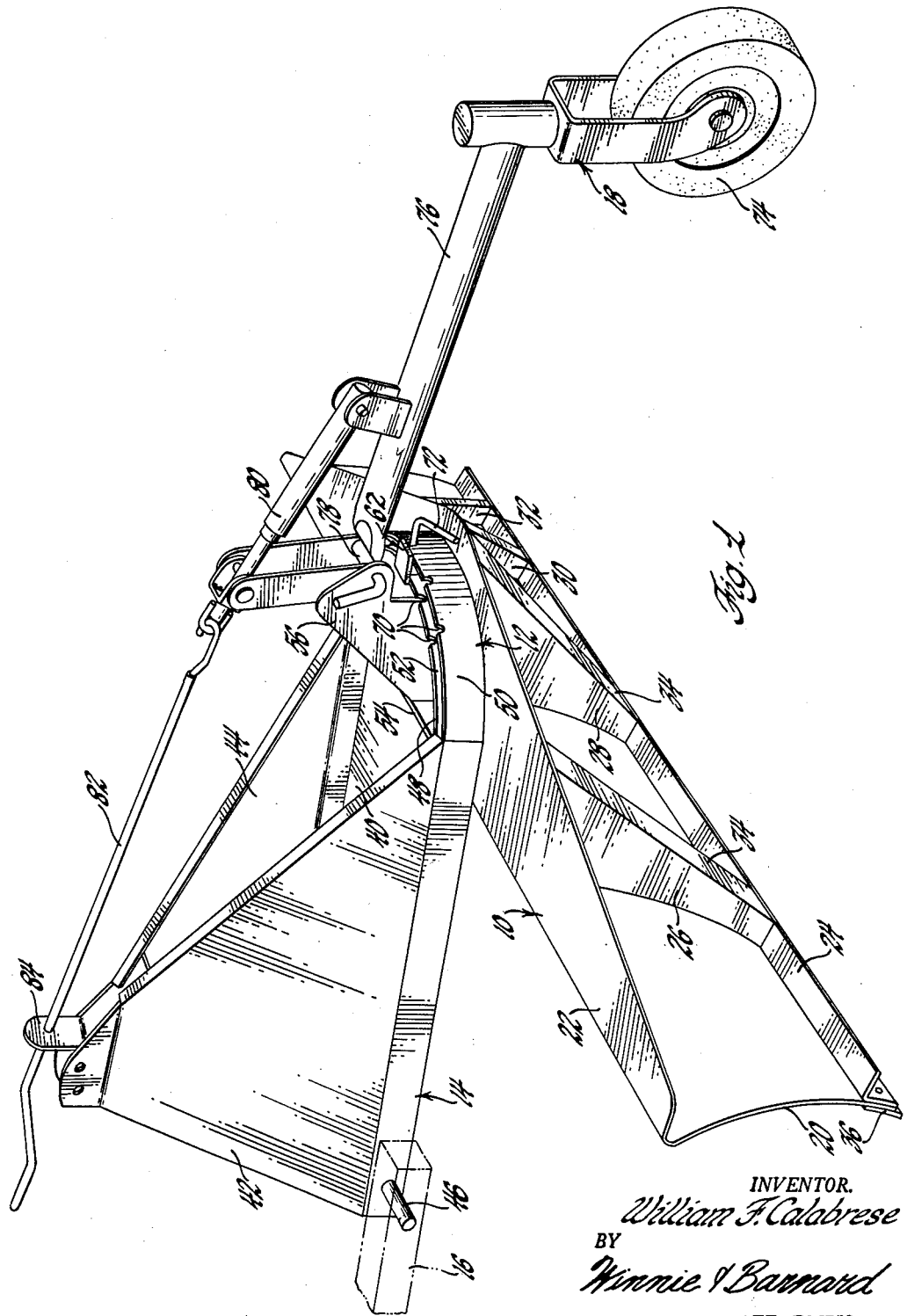
FIGURE 1 is a perspective view of the scraper blade of this invention having a gauge wheel attachment shown therewith.

The scraper blade accessory of this invention includes a scraper blade member 10 engaged to a supporting structure 12 which includes a weight tray 14 through which it is secured to a tractor frame 16. Provision is also made for supporting and carrying a gauge wheel 18, as will be subsequently described.

The scraper blade member 10 is of relatively light gauge sheet metal construction. It includes a blade part 20 and has the upper edge thereof formed at substantially a right angle thereto and providing a supporting flange 22. An angle iron bar 24 is secured to the lower edge of the blade part 20 and reinforcing struts 26, 28, 30 and 32 are secured between the angle iron bar and the supporting flange 22.

The reinforcing struts are of sheet metal construction and have their inner disposed edge contoured to fit and welded to the back side of the scraper blade providing part 20. The struts 26 and 28 converge toward the struts 30 and 32; each pair being provided on opposite sides of the center line of the blade structure. Each of the struts is formed to include a right angle flange 34 at its outer edge for structural reinforcement thereof.

A narrow steel cutting blade 36 is shown secured to the lower edge of the blade part 20 and to the angle iron bar 24 by suitable fastening means 38.

The scraper blade supporting or carrying structure 12 includes a weight tray 14 which has a bottom wall 40 against which the blade flange 22 is received and to which it is engaged by means which afford angular positioning of the blade, as will be described later.

The weight tray 14 has upwardly disposed and converging side walls 42 and 44 which, with the bottom wall 40, provide a receptacle within which large boulders, cement bags, scrap iron or other heavyweight materials may be carried to weight the scraper blade for deeper cutting action. Suitable pin connectors 46 are provided at the forward end of the weight tray 14 for connecting the supporting structure 12 to the tractor frame 16. Such pivotal connection results in the weight carried by the tray 14 being more effectively imposed upon the scraper blade 10 for deeper cutting action.

The part of the bottom wall 40 of the weight tray 14 which extends beyond the tray is semi-circular in shape and has a semi-circular shaped vertical wall member 48 secured thereto. A second semi-circular vertical wall providing member 50 is secured to the side walls of the weight tray 14 and disposed in concentric spaced relation to the first mentioned wall member 48. The spaced wall members 48 and 50 provide a bottomless guideway 52 therebetween.

Structural reinforcement for the inner disposed vertical wall member 48 is provided by a plate member 54 welded to the bottom wall 40 of the weight tray and extended between the side walls 42 and 44 thereof. In addition, gauge wheel supporting bracket members 56 and 58 are secured to the bottom wall 40 and between the cross bar 54 and wall member 48.

The blade flange 22 is secured to the bottom wall 40 of the weight tray 14 by a bolt member 60. The bolt connection 60 provides a pivotal connection between the supporting structure 12 and the scraper blade 10 which enables the scraper blade to be angularly located relative thereto.

A second bolt member 62 having a square shank 64 is fastened to the blade flange 22 opposite the pivotal connection 60 and has the square shank disposed in the guideway 52 and between the wall members 48 and 50. The bolt member 62 includes a head portion 66 on one end and is threaded to receive a nut member 68 on the other end thereof. Accordingly, the square shanked bolt member 62 serves as a vertical stud on the scraper blade projecting upward through the guideway 52 of the supporting structure 12. Angular relocation of the scraper blade 10 relative to the supporting structure 12 will move the bolt member 62 laterally within the guideway 52.

The scraper blade 10 is fixed in selective angular relation to the supporting structure 12 by means which secure the bolt member 62 to the guideway forming walls 48 and 50. Such means include aligned notches 70 receptive of a locking pin 72 received through a suitable hole provided through the square shank 64 of the bolt member 62. When the hole through the bolt is aligned with the notches 70 the locking pin 72 may be disposed through the aligned accesses and will serve to lock the bolt in position and accordingly the scraper blade.

The gauge wheel 18 is of conventionally known construction and forms no part of this invention. It includes a tail wheel 74 and supporting arm structure 76 pivotally connected to the gauge wheel brackets 56 and 58 by a locking pin 78 and including screw thread adjustment means 80 operated by a reach rod 82 that is supported by a suitable bracket 84 provided on top of the weight tray 14. By rotation of the reach rod 82 the gauge wheel may be raised and lowered to effect a relative adjustment of the scraper blade and gauge the depth of cut which will be taken thereby.

As will be appreciated, the scraper blade attachment of this invention may be made of relatively light gauge sheet material in view of the structural reinforcement which is afforded and the necessary weight for deep cutting action will still be available, when desired, by use of the weight tray 14. The blade member 10 may be adjusted to different angular positions by the simple and effective means which have been described. Further, the blade may be reversed as shown by FIGURE 4 and still have the same advantages of angular positioning. Only one bolt is required to be removed to turn a scraper blade around.

Although a preferred embodiment of this invention has been shown and described in considerable detail, it will be appreciated that certain modifications and improvements may be made in the structure without departing from the spirit or scope of the invention. Accordingly, such improvements and modifications as are not specifically excluded by the language of the hereinafter appended claims are to be considered as inclusive thereunder.

I claim:
1. A scraper blade attachment for use with a tractor, and comprising: a scraper blade member formed to include a concave blade portion and having a supporting flange provided integral therewith at the upper edge thereof, an angle iron member secured to the lower back edge of said blade portion and having a cutting blade secured thereto and disposed on the front lower edge of said blade portion, structural braces contoured on at least one side to the shape of the back side of said blade portion and secured thereto and to and between said angle iron member and supporting flange, a blade carrying member including means for pivotally securing said blade member thereto, a semi-circular guideway provided by said blade carrying member, stud means secured to said blade flange and received within said guideway, said stud and said means of pivotally securing said blade member to said supporting member being interchangeable relative to said supporting flange for reversing said blade, said guideway including spaced guide walls and said stud including a square shank received in close fitted guiding engagement therebetween, and a locking pin and suitable accesses formed through said guide walls at spaced locations and through said stud in alignment therewith for locking said blade member in selected angular relation to said carrying member.

2. A scraper blade attachment for use with a tractor, and comprising: a scraper blade supporting frame having means for attachment to a tractor, an earth cutting blade member including a rearwardly disposed flange formed integral therewith and provided at the upper edge thereof, means pivotally securing said flange to said supporting frame, guide means provided on said supporting frame concentric with said last mentioned means, a guide follower provided on said blade flange, means for locking said follower to said guide means for selected arcuate positioning of said plate member relative to said supporting frame, said means pivotally securing said flange to said supporting frame including a pivot pin, and said guide follower including a guide pin provided on said blade flange and disposed for guiding and locking engagement with said guide means, and said pivot pin and guide pin being interchangeable for reversing said blade member.

References Cited in the file of this patent
UNITED STATES PATENTS

| | | |
|---|---|---|
| 347,820 | Moulton | Aug. 24, 1886 |
| 1,225,792 | Ferguson | May 15, 1917 |
| 2,493,565 | Arps | Jan. 3, 1950 |
| 2,560,711 | Arps | July 17, 1951 |
| 2,566,547 | Bartlett | Sept. 4, 1951 |
| 2,723,472 | Bartlett | Nov. 15, 1955 |
| 2,787,847 | Arps | Apr. 9, 1957 |
| 2,983,060 | Rosselot | May 9, 1961 |